April 19, 1966  MANABU KASHIHARA  3,246,531
INFINITELY VARIABLE SPEED CHANGE GEAR
Filed Oct. 19, 1961

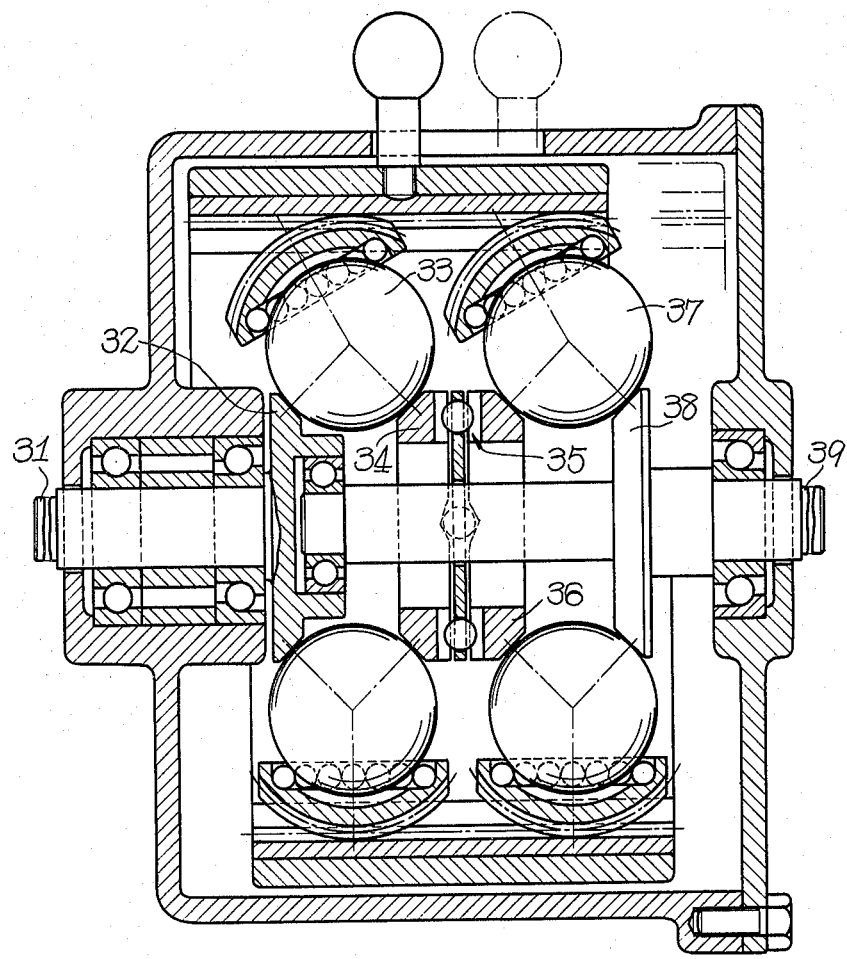

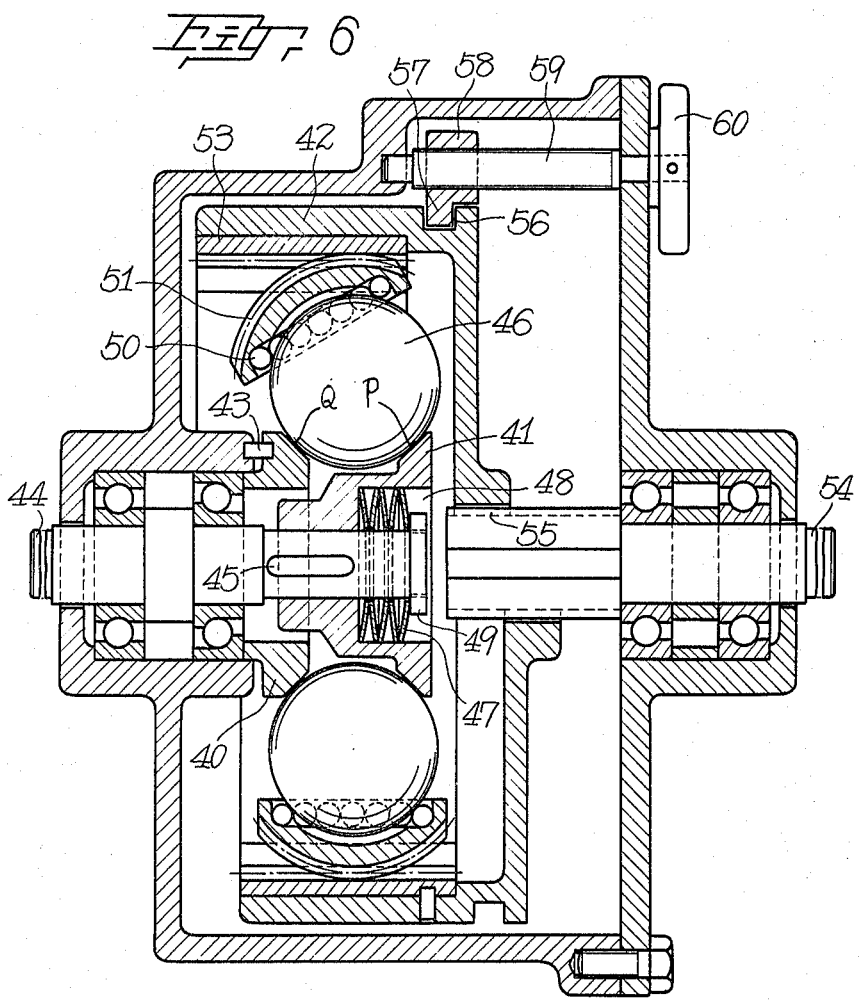

United States Patent Office 3,246,531
Patented Apr. 19, 1966

3,246,531
INFINITELY VARIABLE SPEED CHANGE GEAR
Manabu Kashihara, 12 Karahashi-Hanazono-cho, Minami-ku, Kyoto, Japan
Filed Oct. 19, 1961, Ser. No. 146,266
Claims priority, application Japan, Nov. 4, 1960, 35/44,541; Nov. 24, 1960, 35/45,955
3 Claims. (Cl. 74—200)

This invention relates to an infinitely variable speed change gear.

Heretofore infinitely variable speed change gears comprising a pair of cone wheels which contact at one point to each ball of a group of balls and, an operating means to change the inclination of the axes of the spin of the balls are known. Even though they have an excellent quality to change the speed of the driven shaft in a wide range, they are accompanied not only with constructional difficulties in the supporting of the ball, but also with a disagreeable pressure contact condition between the balls and the cone wheels. As to the infinitely variable speed change gears heretofore known, the power to be transmitted has been limited unavoidably to a relatively small range.

One object of my invention is to overcome the above difficulties and to provide an infinitely variable speed change gear having an agreeable pressure contact condition and being capable to transmit a relatively large amount of power.

Another object of my invention is to provide an infinitely variable speed change gear which has a simple construction and a high durability and is manufactured at a low price.

And according to my invention there is provided an infinitely variable speed change gear comprising a pair of wheels, a large ball or balls contacting at a point to each of said wheels respectively, a group or groups of small balls arranged to roll along a small circle on the spherical surface of each large ball, means to support and arrange the group of the small balls along the small circle, and an operating device to change the position of the means relatively to the wheels, each large ball being spun, during the transmission of power, about an axis passing through the center of the small circle and its own center, the effective radii of the large ball relative to the wheels being varied by the operating device.

The accompanying drawings show several embodiments of the present invention. And the invention will be made clear by the following descriptions referred to the embodiments.

Figure 1:
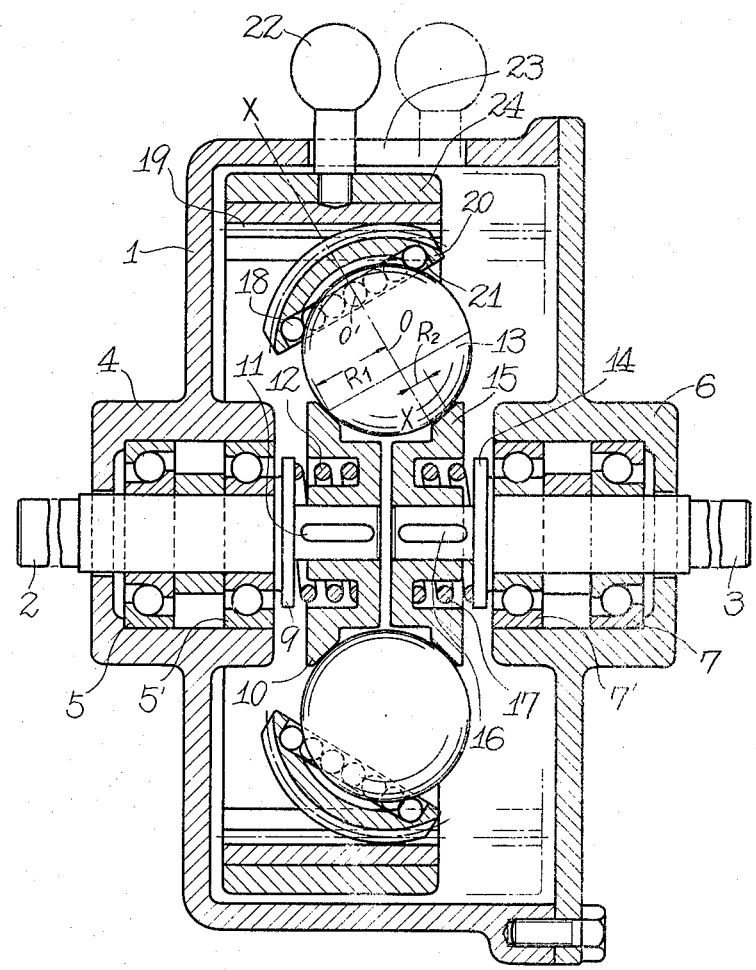
FIG. 1 is a longitudinal section view of an infinitely variable speed change gear according to the present invention.

FIG. 5 is a longitudinal section view of an infinitely variable speed change gear according to the present invention, which takes a similar construction with the gear shown in FIG. 1 except its tandem construction; and FIG. 6 is a longitudinal section view of another infinitely variable speed change gear according to the present invention, in which the revolution of the large balls is transmitted to the driven shaft.

In FIG. 1, 1 is the casing of the speed change gear, and 2, 3 are the driving shaft and the driven shaft respectively. The driving shaft 2 is supported rotatively by bearings 5, 5' in a housing 4 provided on the casing 1, and the driven shaft 3 is supported rotatively by bearings 7, 7' in a housing 6 provided on the casing 1. 9 is a collar provided on the driving shaft 2 and 10 is a cone wheel keyed to the end of the driving shaft 2 by means of a feather key 11. The collar 9 on the driving shaft 2 faces to the side face of the inner race of the bearing 5', and between the collar 9 and the cone wheel 10 a spring 12 is arranged to generate engaging pressures between the cone wheel 10 and a plurality of large balls 13. The driven side is constructed similarly and it comprises a collar 14, a cone wheel 15, a feather key 16 and a spring 17 to generate engaging pressures between the cone wheel 15 and the large balls 13.

Each large ball engages at a small circle on its spherical surface to a group of small balls 18 and spins, during the transmission of power, about an axial line X—X which passes through its own center O and the center O' of the small circle. Each group of the small balls 18 for each large ball 13 is kept on a race surface provided on a concave portion 21 of a sector gear 20 meshed with a rack 19. Each rack 19 for each sector gear 20 is engaged and fixed to an axial groove provided on the common ring 24. All of the sector gears 20 are moved simultaneously to take the same phase by means of an operating handle 22, which is attached to the ring 24 and extended through a slot 23 provided on the casing 1.

In the infinitely variable speed change gear above explained, the transmission of power is carried out through the driving shaft 2, the cone wheel 10, the large balls 13, the cone wheel 15 and the driven shaft 3. And the generation of the engaging pressures between each of the large balls 13 and the small balls 18 is carried out by the cooperation of reactionary force between the cone wheel 10 and the large balls 13, and reactionary force between the cone wheel 15 and the large balls 13.

During the power transmission, each large ball spins about the axis X—X. And if the effective radius of the rotation of the cone wheel 10 is equal to the effective radius of rotation of the cone wheel 15, the difference of the rotating speed between the cone wheels 10, 15 is created proportionally to the amount $R_1-R_2$. $R_1$ and $R_2$ are the distances from the axis X—X to the pressure contact point of the cone wheels 10, 15 respectively.

Figure 2:
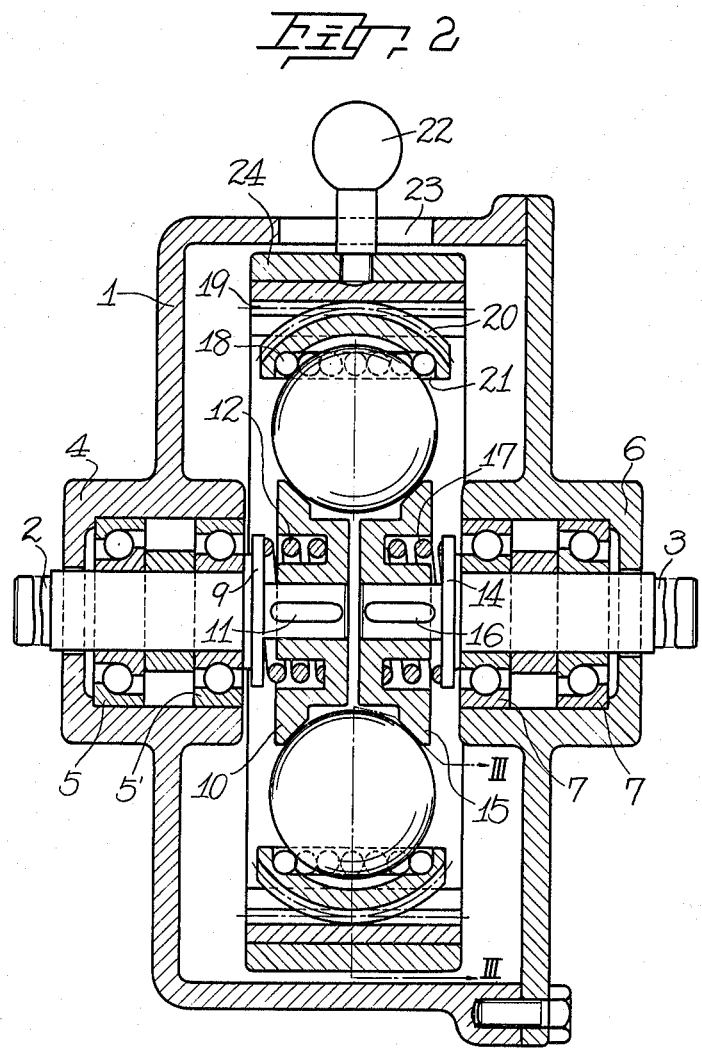
FIG. 2 is also a longitudinal section view of the infinitely variable speed change gear shown in FIG. 1, but the gear is shown in the state providing a reduction ratio equal to 1.
Figure 3:
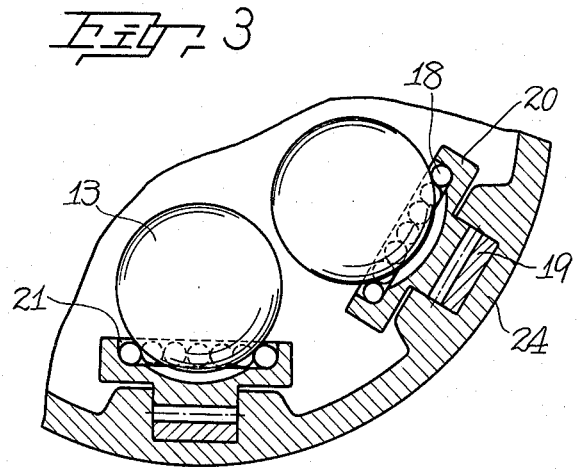
FIG. 3 is a cross-sectional view taken along the line III—III in FIG. 2.

In the state shown in FIG. 1, the rotating speed of the driving shaft 2 is reduced at the driven shaft 3, and, in the state shown in FIG. 2, the driven shaft 3 is rotated at the same speed with the speed of the driving shaft 2. The infinitely variable speed change gear increases the speed of the driven shaft 3 by shifting the handle 22 to the right hand from the state shown in FIG. 2, and decreases the speed of the driven shaft 3 by shifting the handle 22 to the left hand from the state shown in FIG. 2.

Figure 4:
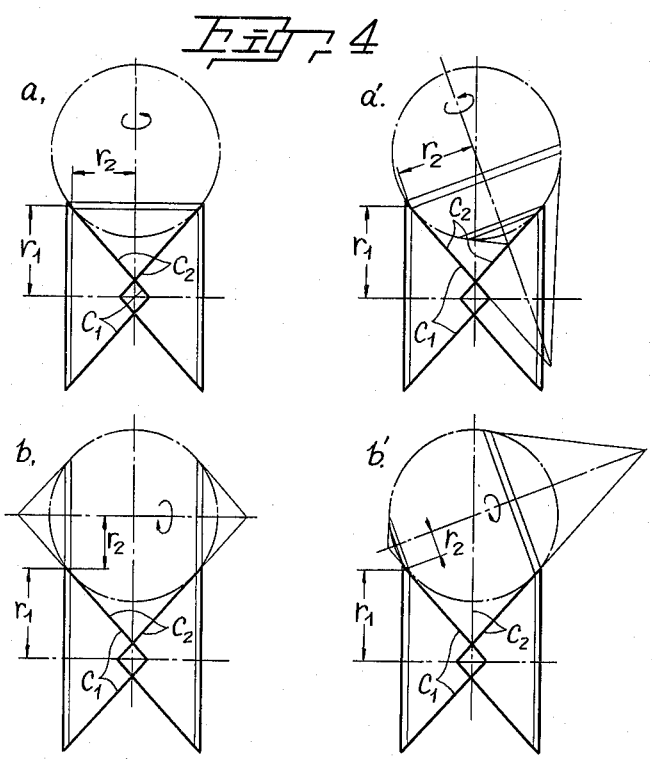
FIG. 4 is a drawing to explain the pressure contact conditions of the infinitely variable speed change gear according to the present invention comparing with one of the gears heretofore known.

One feature of the infinitely variable speed change gear above explained consists in that the large balls 13 have no shaft and also is that the supporting mechanism is quite simple. Another feature of the infinitely variable speed change gear is in that the pressure contact conditions between the large balls 13 and the cone wheels 10, 15 are agreeable ones. Supposing two cone surfaces $C_1$, $C_2$, as shown in FIG. 4a and in FIG. 4b, which contain loci of Hertz's pressure contact areas, the slip rate will be shown as follows.

$$=\frac{r_1 \max}{r_2 \max} \sim \frac{r_1 \min}{r_2 \min}$$

where:

$r_1$ is the effective radius taken on the cone surface $C_1$
$r_1$ max is the maximum value of $r_1$
$r_1$ min is the minimum value of $r_1$
$r_2$ is the effective radius taken on the cone surface $C_2$
$r_2$ max is the maximum value of $r_2$
$r_2$ min is the minimum value of $r_2$ The maximum amount of slip in the Hertz's pressure contact area is given as an amount proportional to the value above mentioned.

As far as I know, the infinitely speed change gears of this kind heretofore known take a form shown in FIG. 4b and FIG. 4b', and the slip rate will be shown as follows.

$$= \frac{r_1 \max}{r_2 \min} \sim \frac{r_1 \min}{r_2 \max}$$

And in this case, a point which has a maximum velocity drives a point which has a minimum velocity and vice versa. Then the slip rate takes very large value compared with the case of the infinitely variable speed change gear according to the present invention, in which a point which has a maximum velocity drives a point which has a maximum velocity and vice versa. This fact means that the speed change gear according to the present invention may be constructed in a small size by raising of the contact pressures or may be constructed to have a high durability by relieving of the pressure contact condition. Further, as the large balls 13 in the speed change gear according to the present invention are not supported by any shaft, the circular locus of the pressure contact points moves gradually and a small circle on the large ball which has not been participated to the pressure contact comes into participation with the pressure contact. Accordingly, the large balls 13 are not worn at a certain portion.

The cone wheel 10 or the cone wheel 15 in the speed change gear shown in FIG. 1 may be substituted to a disc wheel or a ball. Further, in said speed change gear, a race member with center hole may be inserted between the group of balls 18 and the large ball 13.

The infinitely variable speed change gear shown in FIG. 5 may be considered as one, in which two units of speed change gears shown in FIG. 1 are coupled in series and built in a common casing. And in this speed change gear two sets of speed change gears are operated by a common handle. In this speed change gear, power is transmitted to the driven shaft 39 through a cone wheel 32 on the driving shaft 31, large balls 33, cone wheel 34, a "ball and cam engaging device" 35 to generate the engaging pressures, a cone wheel 36, large balls 37 and a cone wheel 38. The features of this gear are the same with the gear shown in FIG. 1.

Assuming that each unit is constructed to have a speed regulation range extending from 1/3 to 3, this speed change gear as a wide speed regulation range extending from 1/9 to 9.

FIG. 6 shows another infinitely variable speed change gear according to the present invention, in which a stationary cone 40, a rotatable cone wheel 41 and a rotatable ring 42 are provided. The stationary cone 40 is held nonrotatable by stud pin 43. The rotatable cone wheel 41 is keyed to the driving shaft 44 by means of a feather key 45. The cone 40 and the cone wheel 41 are engaged to a plurality of large balls 46, and to generate suitable engaging pressures, springs 47 are inserted between the bottom surface of the recessed portion 48 on the cone wheel 41 and a nut 49 screwed onto the end of the driving shaft 44.

Groups of small balls 50 and sector gears 51 are provided similarly with the speed change gear shown in FIG. 1, but the ring 42 which supports the racks 53 is not a stationary one. And the ring 42 is engaged to the driven shaft 54 by means of spline 55 and is permitted to move axially. The ring 42 is provided with a groove 56 on the peripheral cylindrical surface, and a projected portion 57 of a feeding nut 58 engaged on an operating screw bar 59 is engaged into the groove 56. The speed varying operation is executed by turning a grip handle 60 fixed on the screw bar 59.

In the above speed change gear, power is transmitted to the driven shaft 54 through the driving shaft 44, the key 45, the cone wheel 41, the large balls 46, the group of small balls 50, the sector gear 51, the racks 53 and the rotatable ring 42. The mechanism of the power transmission is a kind of a differential gear mechanism and the revolution of the large balls 46 about the axial line of the driven shaft 54 is transmitted to the driven shaft 54. The driven shaft 54 of the speed change gear may be the driving shaft, and then the driving shaft 44 may be the driven shaft.

The extreme value of the rotating speed of the driven shaft 54 is shown in the following table.

| | In a case where the spinning axis of the large balls 46 comes to pass through the engaging point Q between the cone wheel 40 and the large ball 46 | In a case where the spinning axis of the large balls 46 comes to pass through the engaging point P between the cone wheel 41 and the large ball 46 |
|---|---|---|
| Rotating speed | 0 | ∞ |

In reality, the rotating speed of the driven shaft does not increase infinitely, even when the axis X—X passes through the point P. In this speed change gear, it is preferable to provide means to limit the stroke of the ring 42 so as to avoid a state in which an excessively high speed will be generated.

What I claim is:

1. An infinitely variable speed change gear comprising a pair of cone wheels, at least one large ball contacting at a point to each of said cone wheels respectively, at least one group of small balls arranged to roll along a small circle on the spherical surface of each large ball, means to support and arrange the group of the small balls along the small circle, and an operating device to change the position of the means relatively to the cone wheels, each large ball being spun, during the transmission of power, about an axis passing through the center of the small circle and its own center, the attitude of the axis of the large ball with respect to the cone wheels and hence the effective radii of the large ball relative to the cone wheels being varied by the operating device.

2. An infinitely variable speed change gear comprising a driving cone wheel and a driven cone wheel, at least one large ball contacting at a point to the driving cone wheel and the driven cone wheel respectively, at least one group of small balls arranged to roll along a small circle on the spherical surface of each large ball, means to support and arrange the group of the small balls along the small circle, and an operating device to change the position of the means relatively to the driving cone wheel and the driven cone wheel, each large ball being spun, during the transmission of power, about an axis passing through the center of the small circle and its own center, the attitude of the axis of the large ball with respect to the cone wheels and hence the effective radii of the large ball relative to the driving cone wheel and the driven cone wheel being varied by the operating device.

3. An infinitely variable speed change gear comprising a stationary cone and a rotatable cone wheel keyed to a driving shaft, a plurality of large balls contacting at a point to each of the stationary cone and the rotatable cone wheel respectively, groups of small balls arranged to roll along a small circle on the spherical surface of each large ball, means to support and arrange the group of the small balls along the small circle, an operating device to change the position of the supporting and arranging means relatively to the stationary cone and the rotatable cone wheel and means to take out the revolution of the large ball about the axial line of the stationary cone and the rotatable cone wheel, each large ball being spun, during the transmission of power, about an axis passing through the center of the small circle and its own center, the attitude of the axis of the large ball with respect to the rotatable cone wheel and the stationary cone and hence the effective radii of the large ball relative to the stationary cone and the rotatable cone wheel being varied by the operating device.

References Cited by the Examiner

UNITED STATES PATENTS

| | | | |
|---|---|---|---|
| 1,774,176 | 8/1930 | Erban | 74—208 X |
| 2,422,306 | 6/1947 | Laing | 74—198 |

FOREIGN PATENTS

| | | |
|---|---|---|
| 666,691 | 2/1952 | Great Britain. |
| 847,958 | 9/1960 | Great Britain. |

DAVID J. WILLIAMOWSKY, *Primary Examiner.*

BROUGHTON G. DURHAM, DON A. WAITE,
*Examiners.*

T. W. SHEAR, *Assistant Examiner.*